(12) United States Patent
Ventakaramaiah et al.

(10) Patent No.: US 7,970,931 B2
(45) Date of Patent: Jun. 28, 2011

(54) POLICY-BASED ROUTING IN A MULTI-HOMED COMPUTER

(75) Inventors: Narasimhan Agrahara Ventakaramaiah, Redmond, WA (US); Murari Sridharan, Sammamish, WA (US); Biao Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 12/146,478

(22) Filed: Jun. 26, 2008

(65) Prior Publication Data
US 2009/0323681 A1 Dec. 31, 2009

(51) Int. Cl.
G06F 17/00 (2006.01)
H04L 12/56 (2006.01)

(52) U.S. Cl. ........... 709/239; 709/225; 370/351; 726/1; 726/5

(58) Field of Classification Search .................. 709/225, 709/239; 370/351; 726/1, 5
See application file for complete search history.

(56) References Cited

U.S. PATENT DOCUMENTS

| | | | |
|---|---|---|---|
| 5,519,704 A | 5/1996 | Farinacci et al. | |
| 6,578,076 B1 | 6/2003 | Putzolu | |
| 6,789,118 B1 | 9/2004 | Rao | |
| 7,069,336 B2 | 6/2006 | Mangan | |
| 7,133,365 B2 | 11/2006 | Klinker et al. | |
| 7,230,951 B2 | 6/2007 | Mizell et al. | |
| 7,269,157 B2 | 9/2007 | Klinker et al. | |
| 7,362,752 B1 * | 4/2008 | Kastenholz | 370/389 |
| 7,463,587 B2 * | 12/2008 | Rajsic et al. | 370/238 |
| 7,633,898 B2 * | 12/2009 | Jain et al. | 370/328 |
| 7,706,369 B2 * | 4/2010 | Roese et al. | 370/389 |
| 2002/0063915 A1 * | 5/2002 | Levandovsky et al. | 359/110 |
| 2005/0185587 A1 | 8/2005 | Klinker | |
| 2006/0005254 A1 * | 1/2006 | Ross | 726/27 |
| 2006/0045088 A1 | 3/2006 | Nguyen | |
| 2006/0153124 A1 * | 7/2006 | Kant et al. | 370/328 |
| 2006/0268681 A1 * | 11/2006 | Raza | 370/216 |
| 2007/0047446 A1 * | 3/2007 | Dalal et al. | 370/237 |
| 2007/0094716 A1 * | 4/2007 | Farino et al. | 726/5 |
| 2007/0140128 A1 * | 6/2007 | Klinker et al. | 370/238 |
| 2007/0208864 A1 * | 9/2007 | Flynn et al. | 709/227 |
| 2007/0232301 A1 * | 10/2007 | Kueh | 455/433 |
| 2007/0248019 A1 | 10/2007 | Feng et al. | |
| 2008/0097858 A1 * | 4/2008 | Vucina et al. | 705/14 |
| 2008/0270618 A1 * | 10/2008 | Rosenberg | 709/228 |
| 2009/0190591 A1 * | 7/2009 | Sankaran | 370/392 |
| 2009/0197597 A1 * | 8/2009 | Kotecha | 455/433 |
| 2009/0207817 A1 * | 8/2009 | Montemurro et al. | 370/338 |
| 2009/0254572 A1 * | 10/2009 | Redlich et al. | 707/10 |
| 2009/0265429 A1 * | 10/2009 | Gestsson et al. | 709/204 |

OTHER PUBLICATIONS

White Papter, Policy-Based Routing, XP-002241435, published Mar. 7, 2000.*

McManus, Patrick, "Overcoming Asymmetric Routing on Multi-Homed Servers", Date: Apr. 5, 2004, 7 Pages http://www.linuxjournal.com/article/7291.

(Continued)

*Primary Examiner* — Alina N. Boutah

(57) ABSTRACT

Policy-based routing system and method for a multi-homed computer. Policy-based routing permits or blocks usage of system level route(s) based on user credentials and/or network application(s) associated with a data transfer. The credentials can include information associated with an application, a user, and the like. Optionally, one or more filter(s) can be configured over classifiable field(s), such as credential(s), information associated with a determined proposed route, to statically permit/block route usage and/or to invoke an inspection module (e.g., custom inspection routine) when the filter condition(s) are met.

17 Claims, 9 Drawing Sheets

OTHER PUBLICATIONS

Smith, et al., "Efficient Policy-Based Routing without Virtual Circuits", International ICST Conference on Heterogeneous Networking for Quality, Reliability, Security and Robustness, Proceedings of the First International Conference on Quality of Service in Heterogeneous Wired/Wireless Networks, Date: 2004, 10 Pages, Publisher: IEEE Computer Society Washington, DC, USA.

* cited by examiner

US 7,970,931 B2

POLICY-BASED ROUTING IN A MULTI-HOMED COMPUTER

FIELD OF THE INVENTION

The present invention relates generally to multi-homed computers and, more particularly, to policy-based routing in a multi-home computer.

BACKGROUND

Multi-homed computers provide access to network resources over parallel paths. A multi-homed computer can have multiple network interfaces to connect the computer to two or more networks. For computers using Transmission Control Protocol/Internet Protocol (TCP/IP), these interfaces can be separate network interface cards (NICs) and/or multiple IP addresses on one NIC.

In order to route network traffic to its destination, conventionally, routing decisions are based upon system wide policy (ies). The policy(ies) can be implemented through a table of routes that describe the network over which a particular destination IP addresses can be reached. The table of routes is typically maintained at a system level.

Virtual private networks (VPNs) facilitate secure communication between endpoints (e.g., a user computer and a VPN server computer). Often, in a multi-homed environment, communications that need to be secured may not be routed through the VPN channel. For example, a user may desire to communicate via a VPN while communicating in an unsecure manner over the Internet.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The disclosed systems and methods facilitate policy-based routing, for example, in a multi-homed computer. Policy-based routing can permit or block usage of system level route(s) based on user credential(s) and/or network application(s) associated with a data transfer.

A computer-implemented system that facilitates policy-based routing is provided. For example, the system can be a component of a Transmission Control Protocol/Internet Protocol (TCP/IP) stack or a plug-in extending the TCP/IP stack.

The system includes a routing component that receives credential(s) (e.g., information associated with an application, a user, etc.) associated with a data transfer and information associated with a proposed route. The system further includes a policy enforcement component that determines whether the proposed route is permitted or disallowed based on the credential(s) and a stored policy. The policy enforcement component provides information to the routing component as to whether the proposed route is permitted or blocked.

In one embodiment, if usage of the proposed route is blocked, the routing component can continue route lookup in an attempt to find a next proposed route that can be used to reach the destination IP address. This process can be repeated until a permitted route is found or the routing table is exhausted.

The information associated with the determined proposed route can include a destination IP address, a destination interface (and its network prefix) selected as a result of the route determination, transport protocol and/or a next hop IP address (e.g., a gateway) associated with the data transfer. Collectively, the credential(s) associated with the data transfer and information associated with the proposed route can be referred to as "classifiable fields".

The policy enforcement component can, optionally, include one or more filter(s) which can be configured over the classifiable field(s) to statically permit/block route usage and/or to invoke an inspection module (e.g., custom inspection routine) when the filter condition(s) are met. For example, the inspection module can perform route selection dynamically at run-time.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
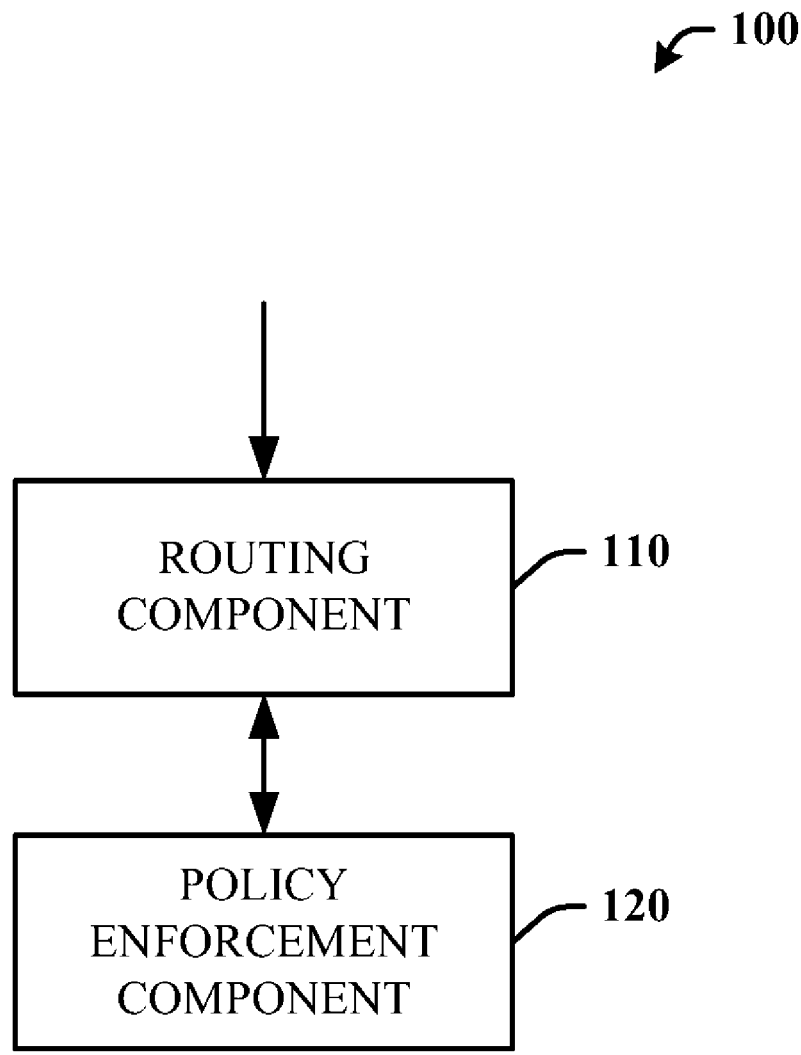
FIG. 1 illustrates a computer-implemented system that facilitates policy-based routing.

The disclosed systems and methods facilitate policy-based routing, for example, in a multi-homed computer. Policy-based routing can restrict access to use networks connected to the computer without impairing the ability of application(s) to route data over other permitted networks.

Policy-based routing can permit or block usage of system level route(s) based on user credentials and/or network application(s) associated with a data transfer. The credentials can include information associated with an application, a user, and the like. Optionally, one or more filter(s) can be configured over classifiable field(s) to statically permit/block route usage and/or to invoke an inspection module (e.g., custom inspection routine) when the filter condition(s) are met.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented system 100 that facilitates policy-based routing. The system 100 can be employed in a multi-homed computer and provide the ability to perform policy-based routing that permits or blocks routing data packets over different networks using system level route(s) based on credential(s) associated with a data transfer. The credential(s) can include information associated with an application, a user, and the like.

The system 100 includes a routing component 110 that receives credentials associated with a data transfer and information associated with a proposed route. The system 100 further includes a policy enforcement component 120 that determines whether the proposed route is permitted or blocked based on the credentials and a stored policy. The policy enforcement component 120 provides information to the routing component 110 as to whether the proposed route is permitted or blocked.

As noted previously, conventionally, routing decisions are based upon system wide policy(ies). The system wide policy(ies) can be implemented through a table of routes that describe the network over which a particular destination IP addresses can be reached. The table of routes is maintained at a system level and is employed for data transfers without regard to application and/or user. However, generally a system wide policy is not sufficient to satisfy the security and/or connectivity requirement(s) of varied applications and/or networks. The system 100 provides the ability to perform policy-based routing that permits or blocks usage of system level route(s) based on credential(s) associated with a data transfer. While permitting or blocking access is possible with general packet filters, the system 100 can select appropriate network(s) to route data for applications over which the applications have access.

The system 100 facilitates routing of a data transfer based on credential(s) associated with the data transfer and a policy. In this manner, a routing policy based, for example, on a wide variety of conditions can be employed to determine whether to permit or block usage of a particular route to a particular destination IP address.

In one embodiment, the system 100 is a component of a Transmission Control Protocol/Internet Protocol (TCP/IP) stack. In another embodiment, the system 100 is a plug-in extending the TCP/IP stack. For example, the enforcement of the policy can be done using a rich policy management infrastructure provided by the Windows Filtering Platform (WFP) that plugs into a TCP/IP implementation.

In one embodiment, when an application attempts to transfer data, the transport layer of the TCP/IP stacks consults the routing 110 to find a proposed route (e.g., best route available) for the transfer. The proposed route is determined based on the table of routes. Thereafter, the routing component 110 provides information associated with the determined proposed route and credential(s) associated with the data transfer to a policy enforcement component 120 which enforces routing policy(ies).

For example, the information associated with the determined proposed route can include a destination IP address, a destination interface (and its network prefix) selected as a result of the route determination, transport protocol and/or a next hop IP address (e.g., a gateway) associated with the data transfer. Collectively, the credentials associated with the data transfer and information associated with the proposed route can be referred to as "classifiable fields".

Figure 2:
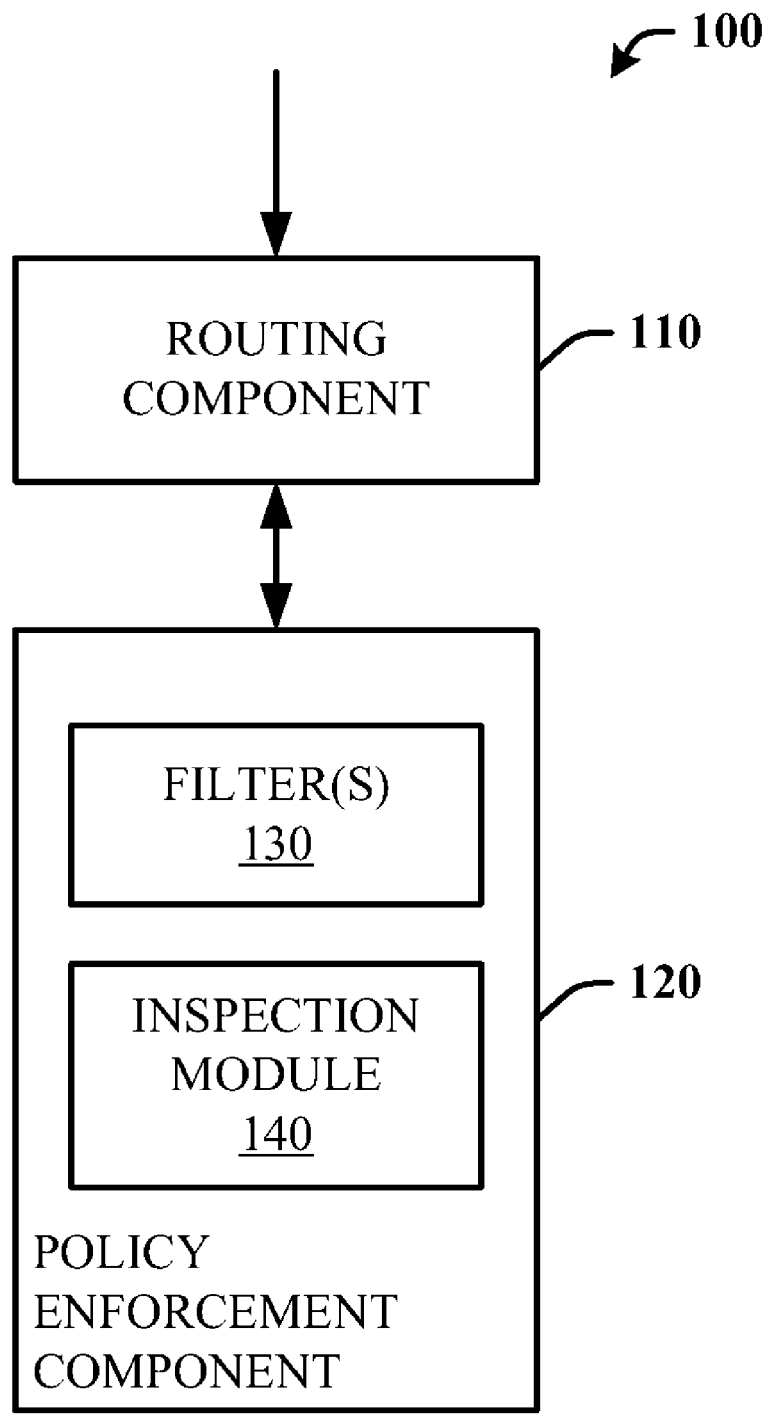
FIG. 2 illustrates a computer-implemented system that facilitates policy-based routing.

Turning briefly to FIG. 2, the policy enforcement component 120 can, optionally, include one or more filter(s) 130 which can be configured over the classifiable field(s) to statically permit/block route usage and/or to invoke an inspection module 140 (e.g., custom inspection routine) when the filter condition(s) are met.

In one embodiment, the policy enforcement component 120 determines whether to permit or block the data transfer based on the credential(s) and information associated with the determined proposed route. The policy enforcement component 120 then provides information to the routing 110 indicating whether to permit or block the requested data transfer on the determined network.

If usage of the proposed route is permitted, the routing component 110 and, more particularly, the TCP/IP stack proceed with operations. However, if usage of the proposed route is blocked, the routing component 110 can continue route lookup in an attempt to find a next proposed route that can be used to reach the destination IP address. This process can be repeated until a permitted route is found or the routing table is exhausted.

In one embodiment, the system 100 can be employed to prepare a network connection for data transfer on demand. Some network connections incur a cost (e.g., monetary and/or infrastructure cost) while the network connections are up and running in anticipation of data transfer. For example, General Packet Radio Service (GPRS) can be employed to transfer network data; however, a monetary cost can be associated with connection via GPRS. For virtual private networks (VPNs), there is an infrastructure cost associated with maintaining state on a VPN server. As a result, the system 100 can be configured to bring up costly communications channels for certain individuals and/or applications while denying communications for use by others.

For example, the policy enforcement component 120 can employ the filter 130 to invoke an inspection module 140 when a particular data transfer is based on one or more classifiable field(s). When there is data to be sent, the network interface can be configured from the inspection module 140. When there is no active data transfer, the connection can be disabled.

In one embodiment, the system 100 can be employed to provide secure network access to specific user(s) and/or application(s). For example, in VPN scenarios it can be desirable to restrict access of the VPN connection(s) to certain application(s) while allowing other application(s) to connect via another connection (e.g., public Internet connection). This can be achieved by configuring policy(ies) to allow data sent by authorized application(s) to be routed over the VPN. In this manner, the policy can be configured to block unauthorized application(s) from using the VPN connection while the unauthorized application(s) can be permitted to use another connection (e.g., public Internet connection). Further, a policy can be configured to prepare the VPN interface for data transfer on demand when a particular application and/or user requests data transfer.

In one example, the policy(ies) can be configured for the presence of multiple dormant interfaces (e.g., interfaces that are not active, but can be brought out of dormancy). Multiple dormant interfaces can be used to provide resiliency in situations where an underlying protocol used by a network interface does not work.

Optionally, the system 100 can route traffic from a computer through a proxy or a firewall—but allow certain exceptions for components like the printer service to access a local printer.

The system 100 can, optionally, be employed to influence routing behavior. For example, the policy enforcement component 120 can restrict a particular user's network traffic to a particular route. This can be useful, for example, to facilitate load balancing.

Further, the policy enforcement component 120 can employ a quality-based routing policy. The quality-based routing policy can be based, for example, on subscription payment levels. User(s) and/or application(s) with a higher subscription payment level can be routed to a network with higher available bandwidth while user(s) and/or application with a lower subscription payment level can be routed to a network with a lower available bandwidth.

Figure 3:
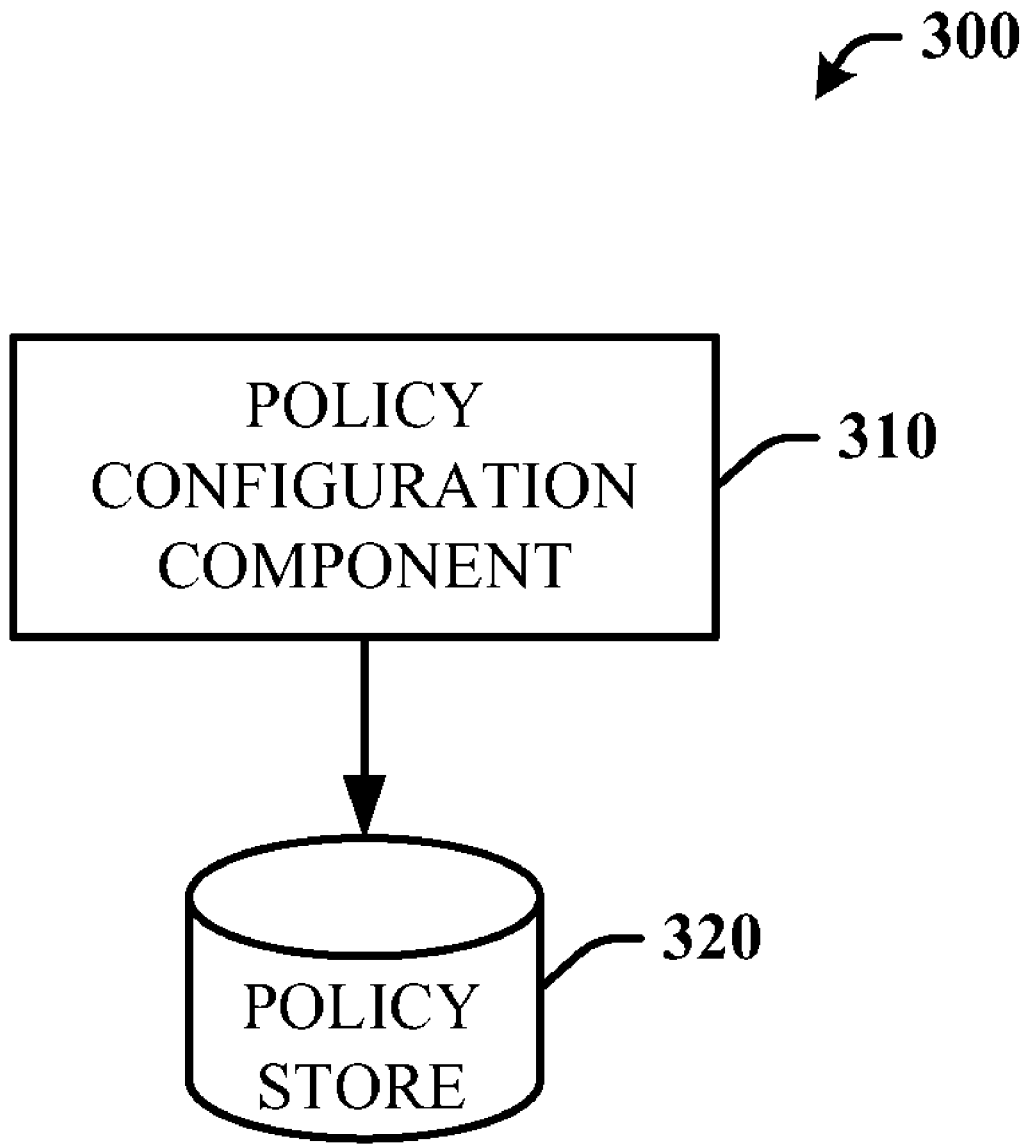
FIG. 3 illustrates a computer-implemented policy configuration system.

Next, FIG. 3 illustrates a computer-implemented policy configuration system 300. The system 300 can be employed to configure policy(ies) to be utilized by a policy enforcement component 120. The system 300 includes a policy configuration component 310 which configures a policy store 320. The policy store 320 can store one or more policy(ies) for routing data. For example, a policy can be based on classifiable field(s) such as user(s), application(s), gateway address and/or destination address(es).

In one embodiment, the policy configuration component 310 resides on the same computer system as the policy store 320. For example, the policy configuration component 310 can include user interface(s) to guide a user (e.g., administrator) in configuring policy(ies) to be employed.

In another embodiment, the policy configuration component 310 resides on a computer system remote from the policy store 320. For example, the policy configuration component 310 can reside on a VPN server and be accessible to an administrator of the VPN. The administrator can configure policy(ies) which are then stored locally in the policy store 320 of computer system(s) of user(s) of the VPN.

Figure 4:
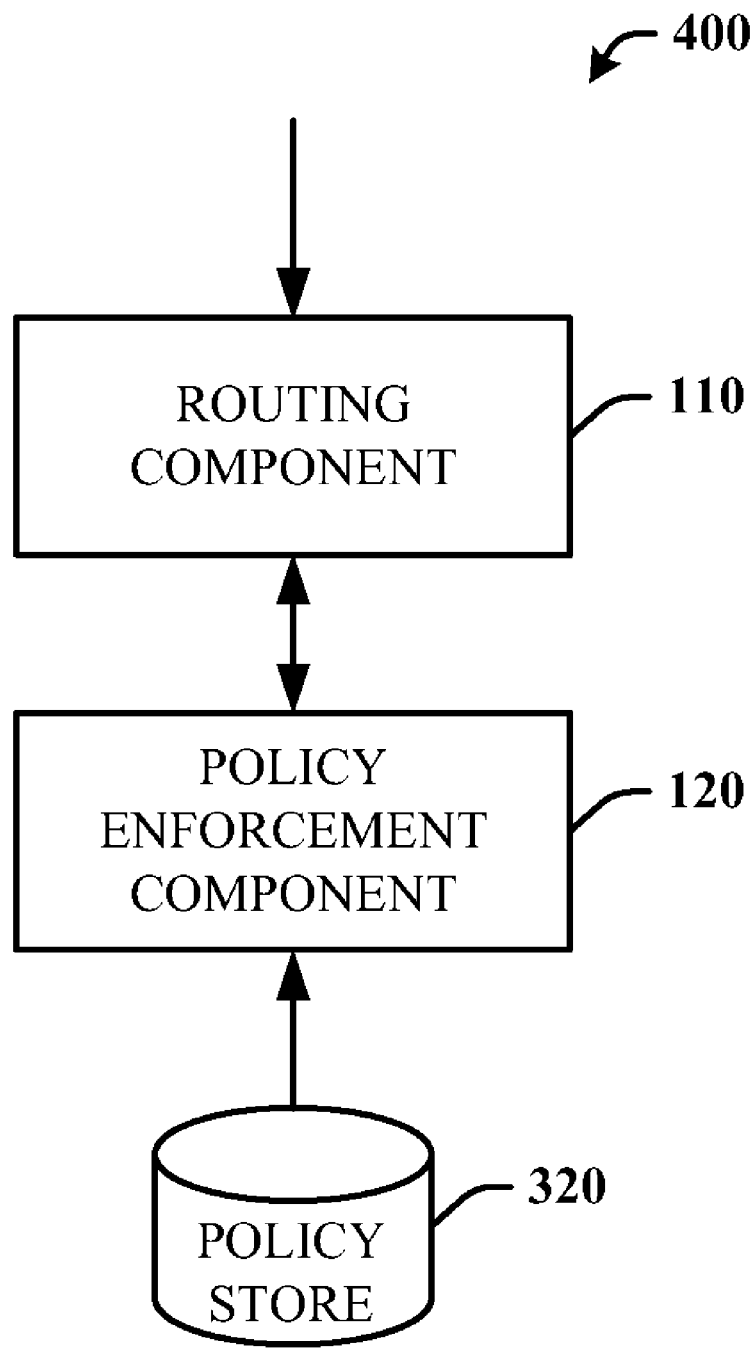
FIG. 4 illustrates a computer-implemented system that facilitates policy based routing with a policy store.

For example, the administrator can configure a policy which is stored in a central database. Upon connection to the VPN, the policy can be stored locally in a policy store 320 of a user's computer system as illustrated by system 400 of FIG. 4. Optionally, the policy(ies) stored in the policy store 320 can be a combination of static policy(ies) associated with a user's computer system and policy(ies) associated with the VPN.

Figure 5:
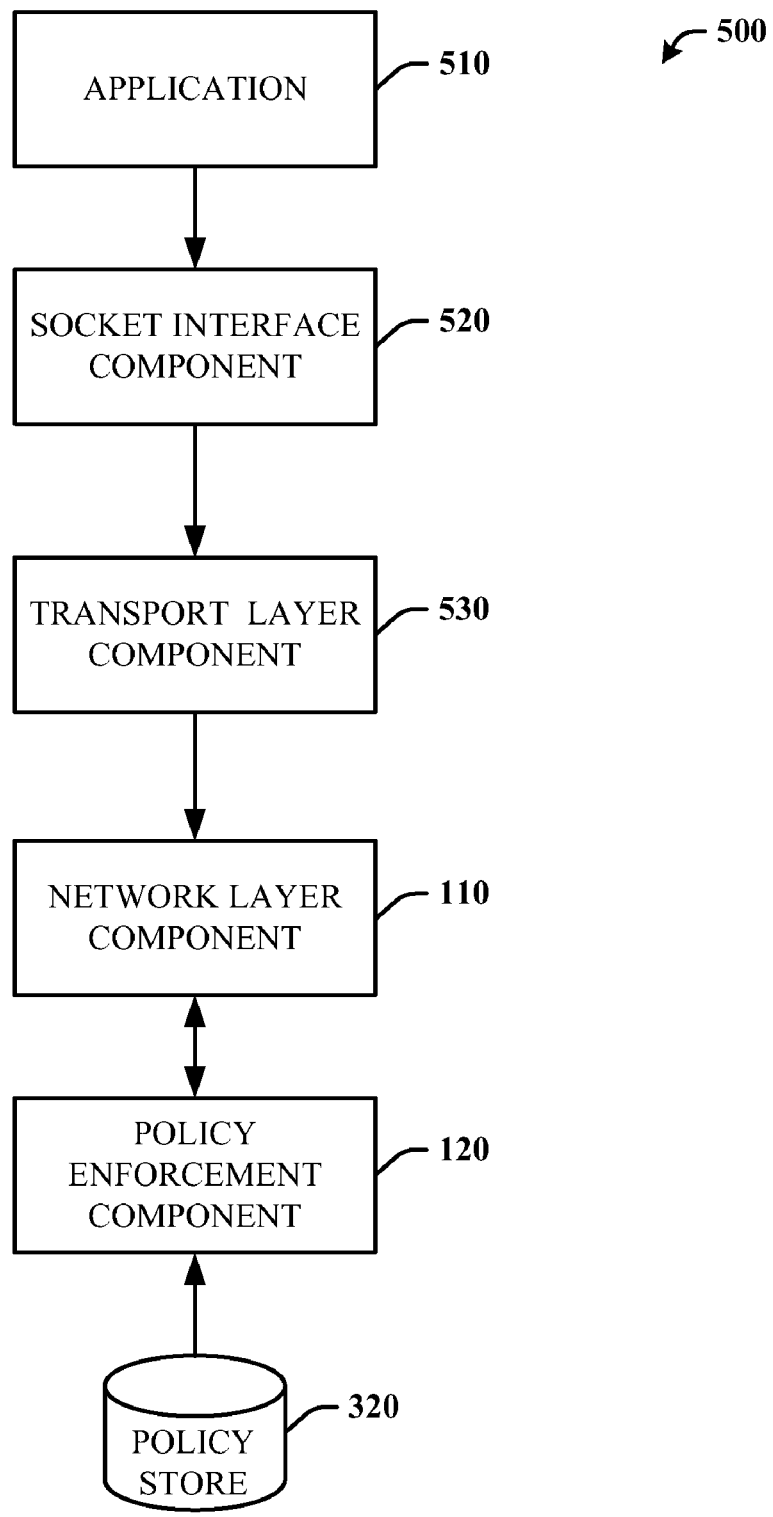
FIG. 5 illustrates a computer-implemented system that facilitates policy-based routing.

FIG. 5 illustrates a computer-implemented system 500 that facilitates policy-based routing. The system 500 can be employed in a multi-homed computer and provide the ability to perform policy-based routing that permits or blocks usage of system level route(s) based on credential(s) associated with a data transfer.

In one embodiment, an application 510 initiates a data transfer by providing data to be transferred along with a destination IP address to a socket interface 520 (e.g., winsock). The socket interface 520 calls into the transport layer component 530 providing the data to be transferred, destination IP address and associated credential(s) (e.g., information associated with an application, a user, etc.).

The transport layer component 530 provides the destination IP address and associated credential(s) to a routing component 110. The routing component 110 determines a proposed route (e.g., best route) based on the destination IP address and provides information associated with the proposed route and the credential(s) to the policy enforcement component 120.

The policy enforcement component 120 determines whether the proposed route is permitted or blocked based on the credentials and a policy stored in a policy store 320. The policy enforcement component 120 provides information to the routing component 110 as to whether the proposed route is permitted or blocked. For example, given the credential(s) of the application 510, the IP destination address, selected interface, transport protocol and/or identified next hop address, the policy enforcement component 120 can determine whether to permit or block the requested data transfer.

If usage of the proposed route is permitted, the routing component 110 and the transport layer component 530 proceed with the data transfer. However, if usage of the proposed route is blocked, the routing component 110 can continue route lookup in an attempt to find the next proposed route that can be used to reach the destination IP address. This process can be repeated until a permitted route is found or the routing table is exhausted.

Figure 6:
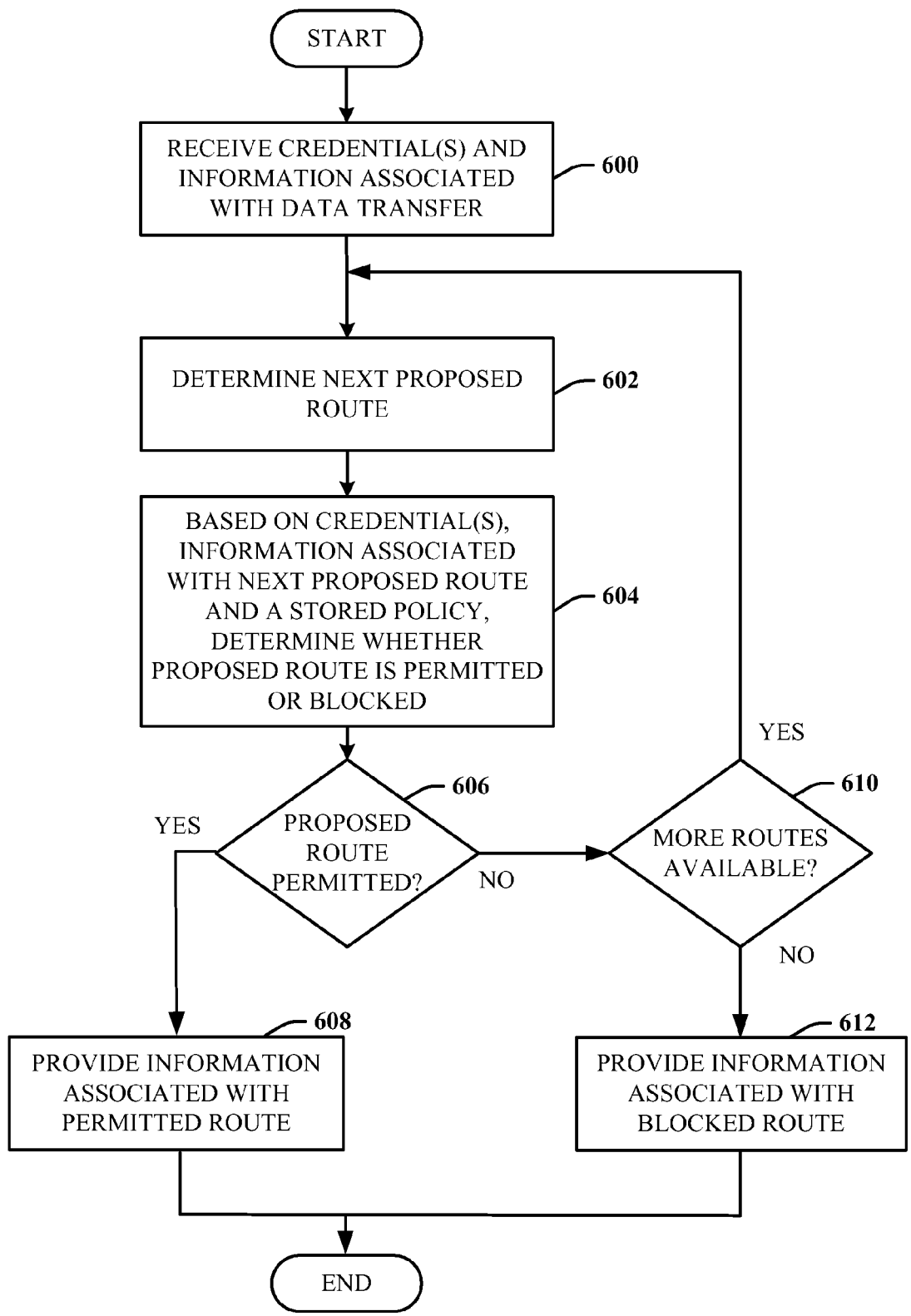
FIG. 6 illustrates a method of policy-based routing.

FIG. 6 illustrates a method of policy-based routing. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 600, credential(s) and information associated with a data transfer are received, for example, from a transport layer of a TCP/IP stack. At 602, a next proposed route is determined. For example, a routing component 110 can lookup an available route based upon an IP destination address.

At 604, based on the credential(s), information associated with the next proposed route (e.g., IP destination address, selected interface, transport protocol, identified next hop address, etc.) and a stored policy, it is determined whether the next proposed route is permitted or blocked. At 606, a determination is made as to whether the proposed route is permitted. If the determination at 606 is YES, at 608, information associated with the permitted route is provided (e.g., to a transport layer) and the method ends.

If the determination at 606 is NO, at 610, a determination is made as to whether more routes are available (e.g., in the table of routes). If the determination at 610 is YES, processing continues at 602. If the determination at 610 is NO, at 612, information associated with the blocked route is provided (e.g., to a transport layer) and the method ends.

Figure 7:
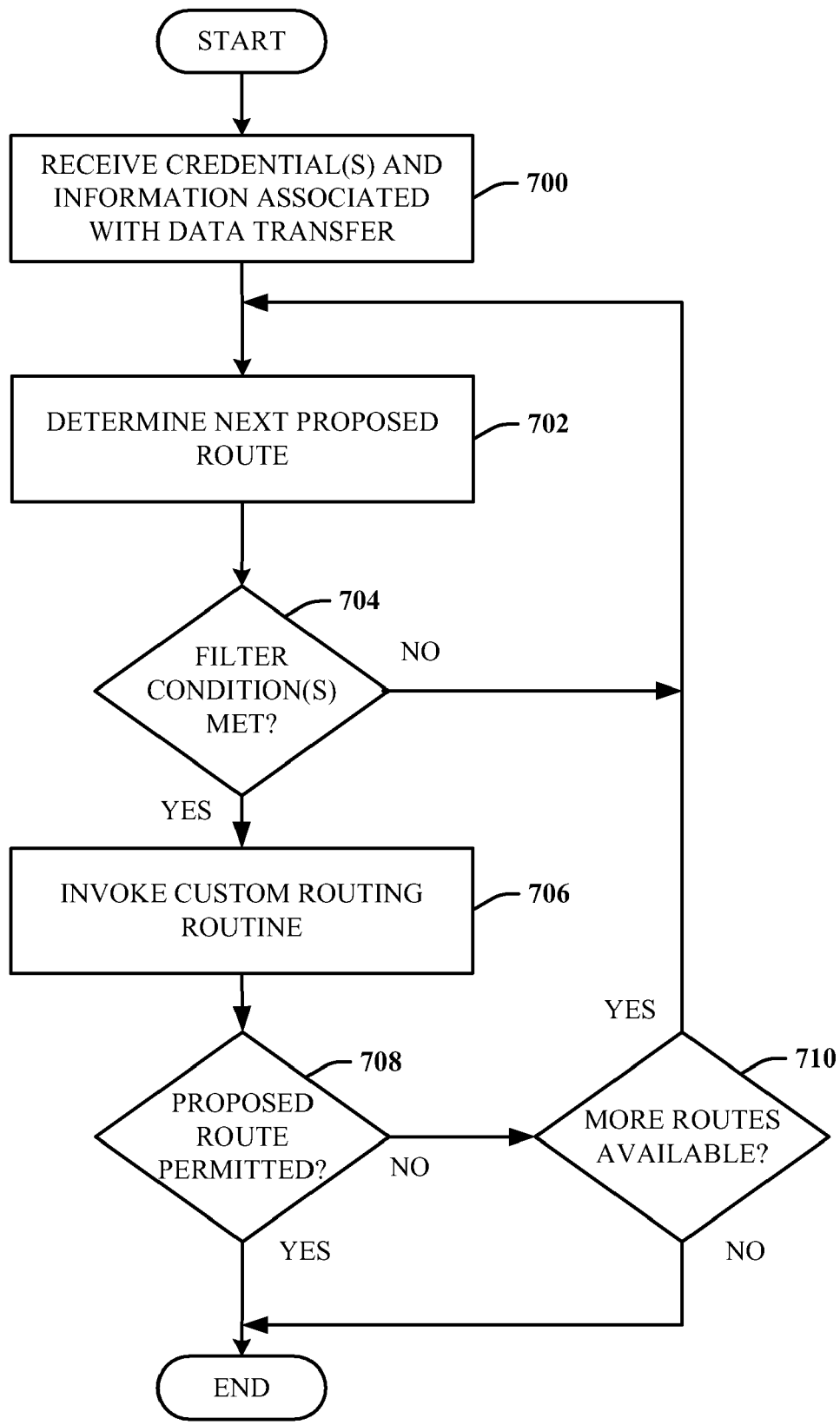
FIG. 7 illustrates a method of policy-based routing.

FIG. 7 illustrates a method of policy-based routing. At 700, credential(s) and information associated with a data transfer are received. At 702, a next proposed route is determined. At 704, a determination is made as to whether filter condition(s) have been met. For example, the filter condition(s) can include one or more classifiable field(s) such as a user, an application, a destination IP address etc. If the determination at 704, NO, processing continues at 702.

If the determination at 704 is YES, at 706, a custom routing routine is invoked. The custom routing routine can include, for example, configuring a network connection. At 708, a determination is made as to whether the proposed route is permitted. If the determination at 708 is YES, no further processing occurs.

If the determination at 708 is NO, at 710, a determination is made as to whether more routes are available. If the determination at 710 is YES, processing continues at 702. If the determination at 710 is NO, no further processing occurs.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 8:
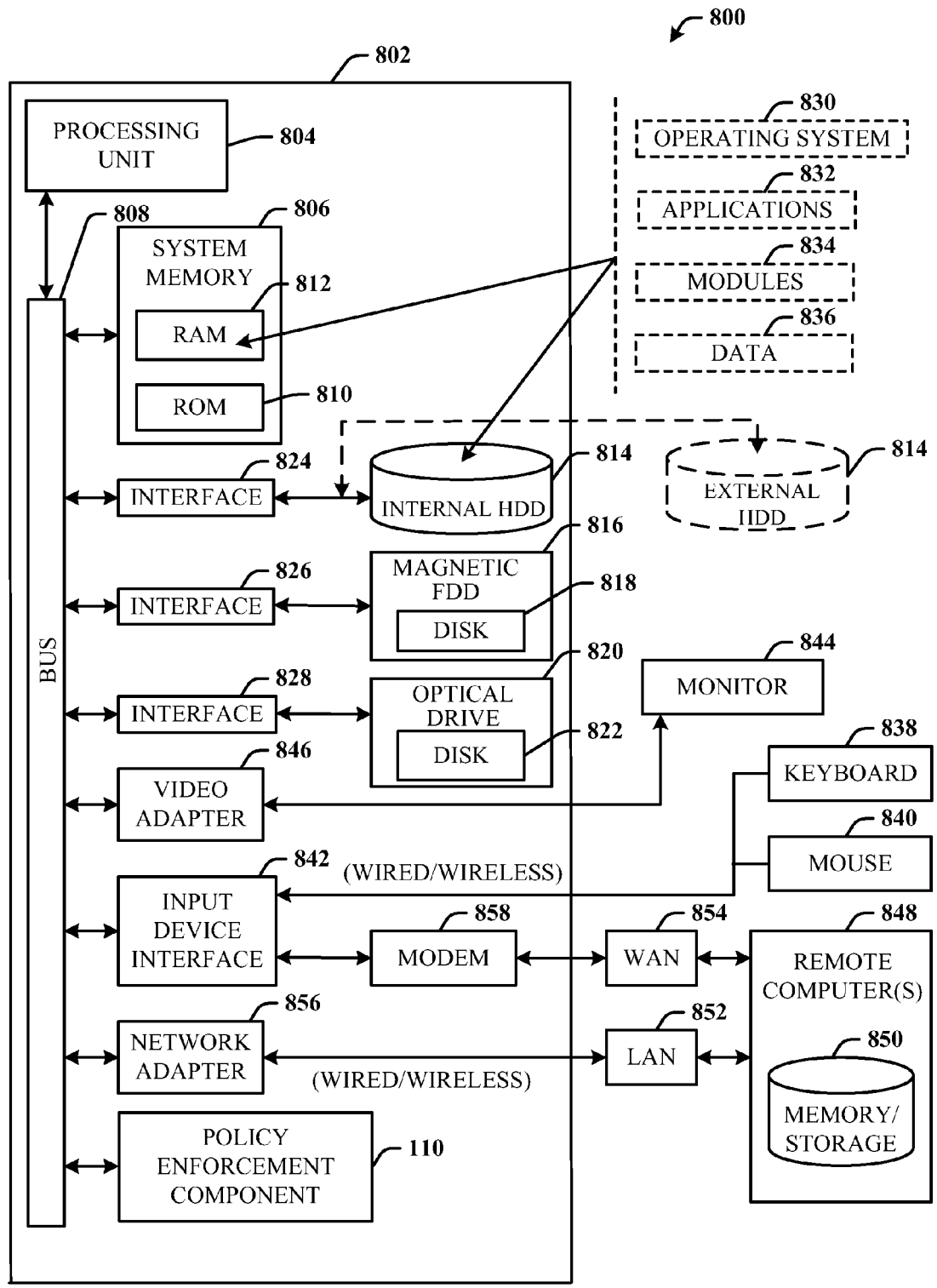
FIG. 8 illustrates a computing system operable to execute the disclosed architecture.

Referring now to FIG. 8, there is illustrated a block diagram of a computing system 800 operable to execute the disclosed policy-based routing architecture. In order to provide additional context for various aspects thereof, FIG. 8 and the following discussion are intended to provide a brief, general description of a suitable computing system 800 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the exemplary computing system 800 for implementing various aspects includes a computer 802, the computer 802 including a processing unit 804, a system memory 806 and a system bus 808. The system bus 808 provides an interface for system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in the read-only memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The internal hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 812, including an operating system 830, one or more application programs 832, other program modules 834 and program data 836. All or portions of the operating system, applications, modules, and/or data can also be cached in the RAM 812. It is to be appreciated that the disclosed architecture can be implemented with various commercially available operating systems or combinations of operating systems.

A user can enter commands and information into the computer 802 through one or more wired/wireless input devices, for example, a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wired and/or wireless communication network interface or adapter 856. The adapter 856 may facilitate wired or wireless communication to the LAN 852, which may also include a wireless access point disposed thereon for communicating with the wireless adapter 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

The computer 802 can further include a policy enforcement component 120 that determines whether a proposed route is permitted or blocked based on credentials and a policy, as discussed in greater detail above.

Figure 9:
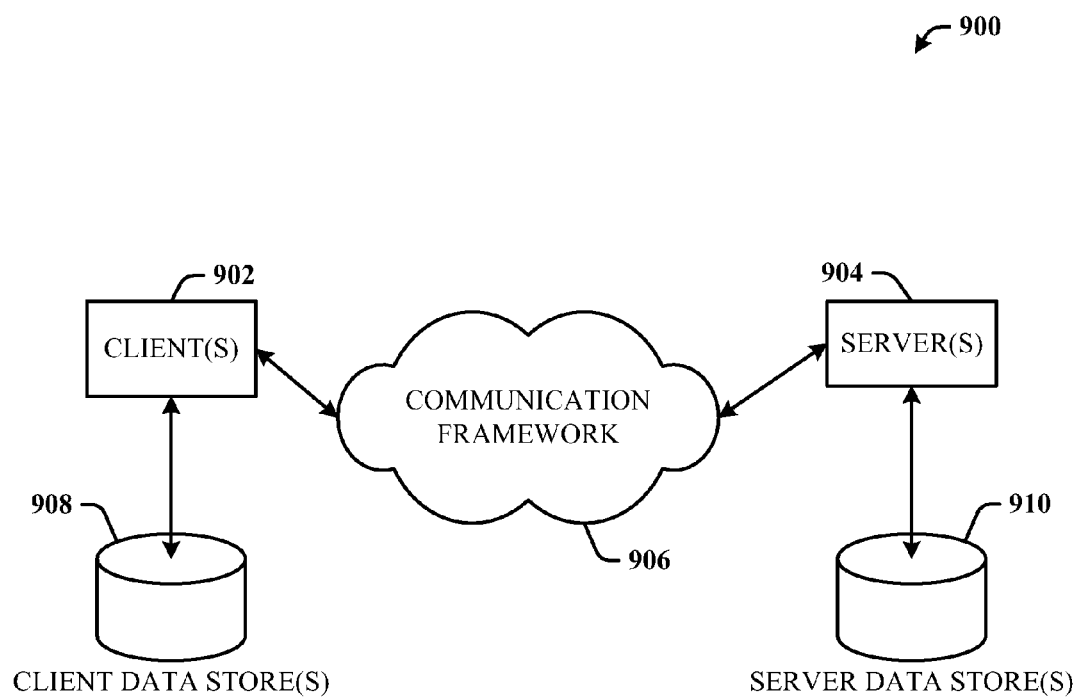
FIG. 9 illustrates an exemplary computing environment.

Referring now to FIG. 9, there is illustrated a schematic block diagram of an exemplary computing environment 900 that facilitates policy-based routing. The environment 900 includes one or more client(s) 902. The client(s) 902 can be hardware and/or software (e.g., threads, processes, computing devices).

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates policy-based routing, comprising:
   a computer comprising a processing unit and a system memory, the computer further comprising:
   a routing component that receives information associated with a user and information associated with an application associated with a data transfer and generates a route proposal; and
   a policy enforcement component that determines whether the proposed route is permitted or blocked based on the information associated with the user, information associated with the application and a policy, wherein the policy is based on a subscription level associated with the user, and wherein the policy enforcement component provides information to the routing component as to whether the proposed route is permitted or blocked.

2. The system of claim 1, wherein if the proposed route is blocked, the policy enforcement component receives another proposed route from the routing component and the policy enforcement component determines whether the another proposed route is permitted or blocked based on the credentials and the policy.

3. The system of claim 2, wherein the policy enforcement component continues to receive proposed routes from the routing component until a permitted route is determined or available routes have been exhausted.

4. The system of claim 1, further comprising a filter that invokes an inspection module if a filter condition is met.

5. The system of claim 4, wherein the inspection module configures a network interface and a network connection on demand.

6. The system of claim 5, wherein the network connection is associated with a virtual private network.

7. The system of claim 5, wherein the network connection is based on a General Packet Radio Service.

8. The system of claim 4, wherein the filter condition comprises information associated with the proposed route.

9. The system of claim 1, wherein the stored policy is received from a computer remote from the system.

10. The system of claim 1, employed in a multi-homed computer.

11. The system of claim 1, employed in a Transmission Control Protocol/Internet Protocol stack.

12. The system of claim 1, wherein the information associated with a proposed route comprises at least one of a destination IP address, a destination interface, a transport protocol or a next hop IP address.

13. A computer-implemented method of policy-based routing, comprising:

receiving information associated with a user and information associated with an application a credential associated with a data transfer and information associated with a proposed route;

determining whether the proposed route is permitted, based on the information associated with the user, the information associated with the application and a policy, wherein the policy is based on a subscription level associated with the user; and, if the proposed first route is permitted, allowing the data transfer, wherein receiving the information associated with the user and information associated with the application associated with the data transfer and information associated with a proposed route and determining whether the proposed route is permitted, based on the credential and the policy is repeated until a permitted route is determined or available routes have been exhausted.

14. The method of claim 13, further comprising: if the proposed route is not permitted, blocking the data transfer.

15. A computer-implemented method of policy-based routing, comprising:

using a computer system, receiving credentials associated with a data transfer and information associated with a proposed route, the credential comprising information associated with a user and information associated with an application; determining whether a filter condition has been met;

invoking a custom inspection module, if the filter condition has been met, the custom inspection module resident on the computer system;

determining whether the proposed route is permitted, based on the credentials and a policy, if the filter condition has been met, wherein the policy is based on a subscription level associated with the user; and blocking the data transfer, if the filter condition has not been met.

16. The method of claim 15, wherein the custom inspection module configures a network connection associated with the data transfer.

17. The method of claim 15, wherein the filter condition comprises of information associated with a user an and information associated with the proposed route.

* * * * *